United States Patent [19]

Ayers et al.

[11] Patent Number: 4,493,590
[45] Date of Patent: Jan. 15, 1985

[54] METHOD AND APPARATUS FOR ON SURFACE JOINING OF SUBMARINE PIPELINE SEGMENTS USING AN ECCENTRIC HINGE

[75] Inventors: Ray R. Ayers; Dean P. Hemphill, both of Houston, Tex.

[73] Assignee: Shell Oil Company, Houston, Tex.

[21] Appl. No.: 339,607

[22] Filed: Jan. 15, 1982

Related U.S. Application Data

[63] Continuation of Ser. No. 106,820, Dec. 26, 1979, abandoned.

[51] Int. Cl.³ .............................................. F16L 1/04
[52] U.S. Cl. ................................... 405/170; 405/166; 405/173
[58] Field of Search .............. 405/158, 166, 168, 169, 405/170, 173; 29/237, 464; 285/18, 23, 24, 26, 29, 39, 87

[56] References Cited

U.S. PATENT DOCUMENTS

| | | | |
|---|---|---|---|
| 3,215,456 | 11/1965 | Schmid | 285/87 X |
| 3,431,739 | 3/1969 | Richardson et al. | 405/169 |
| 3,592,239 | 7/1971 | Adler | 405/170 X |
| 3,665,579 | 5/1972 | Jaeger et al. | 29/237 |
| 3,724,061 | 4/1973 | Schipper | 29/464 |
| 3,835,655 | 9/1974 | Oliver | 405/170 |
| 3,955,599 | 5/1976 | Walker | 405/169 X |
| 4,041,719 | 8/1977 | Baugh | 405/169 |
| 4,068,492 | 1/1978 | Reneau | 405/170 |
| 4,183,697 | 1/1980 | Lamy | 405/170 |
| 4,229,120 | 10/1980 | Wallace et al. | 405/158 |

*Primary Examiner*—David H. Corbin

[57] ABSTRACT

An eccentric hinge is provided for laying submarine pipelines which facilitates joining long segments of the pipeline by raising adjacent ends of the segments, attaching the hinge thereto, and lowering the segments and hinge to the sea-floor while remotely applying tension to one of the segments.

11 Claims, 16 Drawing Figures

METHOD AND APPARATUS FOR ON SURFACE JOINING OF SUBMARINE PIPELINE SEGMENTS USING AN ECCENTRIC HINGE

This is a continuation of application Ser. No. 106,820, filed Dec. 26, 1979, now abandoned.

BACKGROUND OF THE INVENTION

Conventional marine pipeline construction entails use of a barge to weld pipe segments together and then lay the assembled joints on the seafloor, using a pipe support stinger and maintaining proper tensioning of the pipe. An alternative to this "stove pipe" method is found in towing out from shore very long (one to ten mile) strings of welded pipe segments, then connecting these strings on-site to form the pipeline. This alternative method is referred to as a towed string method, regardless of whether the strings are towed on bottom or near the surface.

The joining of two long strings of pipe near the water's surface, normally associated with use of a towed string pipelay method, includes these cases: both string ends are initially on bottom and must be raised for joining; a previously laid string is initially on bottom and the other arriving string is floating, ready for joining; and a previously laid string is on bottom and the arriving string has been towed to location on bottom, but with the forward end near the surface, in a "nose up" fashion.

Figure 1:
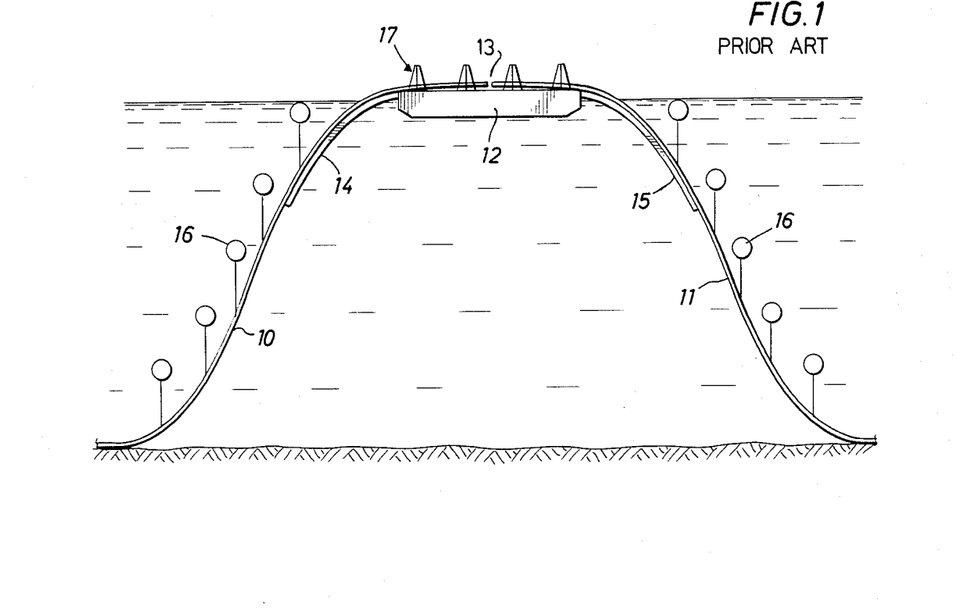
FIG. 1 discloses the prior art string joining of pipelines along a horizontal axis.

The conventional method for joining two such strings is to grip the pipe ends and align them based on a common horizontal pipe centerline axis. With the string ends in this position a weld is made or a mechanical connector installed. In order to prevent the suspended portions of the pipe strings from buckling during this operation, these suspended portions must be supported in the overbend by a stinger, davits or by buoys and in the sagbend by maintaining tension on the string ends. This is illustrated in FIG. 1.

Various problems are associated with this conventional method of joining two long pipe strings, e.g., large forces are required to deform the string ends into proper horizontal alignment; support stingers and/or buoys are difficult to control and subject to damage in rough offshore weather; and, support stingers and/or buoys are expensive and have a short useful life. Such problems make connection by this method risky and expensive.

SUMMARY OF THE INVENTION

The present invention provides a method for the offshore joining of two pipe strings at least near the surface of the water, part of each pipe string laying on the seafloor during at least part of the time of joining, by positioning adjacent ends of both pipe strings at least near the surface of the water, hinging the adjacent pipe ends together, and lowering the hinged pipe ends to the seafloor while simultaneously exerting tension on one of the pipe strings from a remote location.

In addition the invention includes a method for aligning two pipe ends by affixing the pipe ends with disconnected hinge halves each having a pivot axis exterior the pipe ends, positioning the pipe ends at an angle to the horizontal and at about the same relative height such that the center lines of the pipe ends cross a common point above the pipe ends and merging the pivot axes of the hinge halves below the pipe ends, rotatably connecting the hinge halves at the merged pivot axes, and lowering the pipe ends to an aligned position.

The invention also pertains to an apparatus for aligning two pipe ends including disconnectable hinge halves which are rotatably attachable to the pipe ends, each hinge half having a pivot axis which is (a) exterior of the pipe end, (b) perpendicular to a plane containing the pipe end center line and (c) at least close to a plane formed by the circumferential edge of the pipe end, and means for rotatably attaching the hinge halves at the pivot axes.

DESCRIPTION OF PREFERRED EMBODIMENTS

Figure 2:
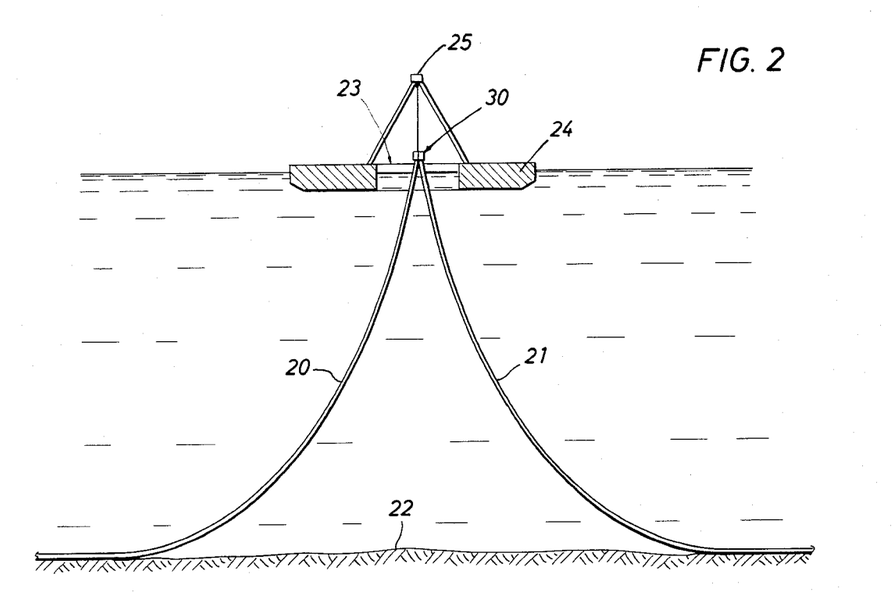
FIG. 2 discloses the alignment hinge joining of pipelines in accordance with the present invention.
Figure 3:
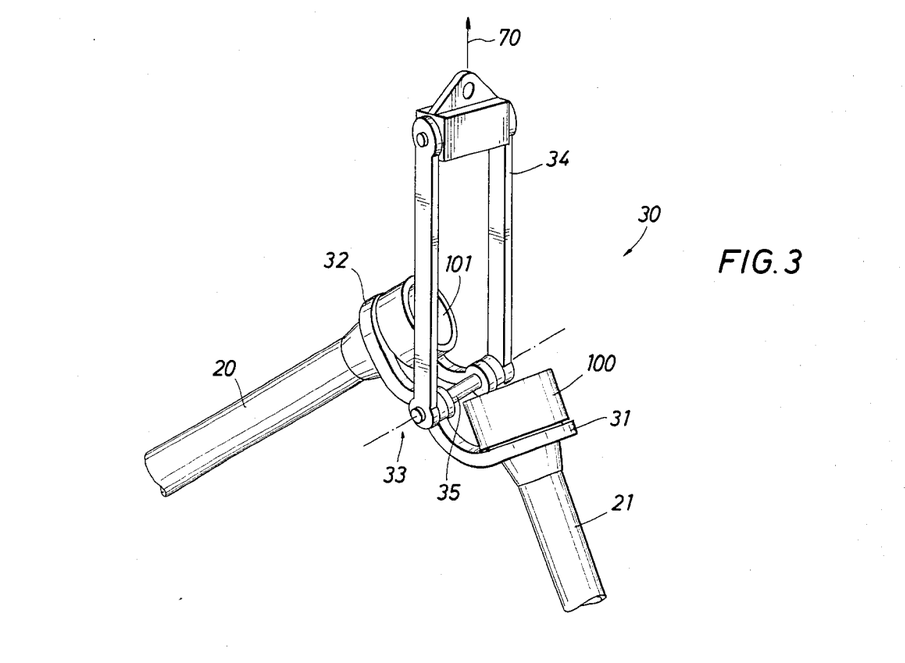
FIG. 3 shows the eccentric hinge of the invention.

The present invention provides a technique for hinging two long strings of pipe together at a string joining vessel without excessive aligning forces and without use of a stinger or buoys. The technique of the prior art for string joining with a horizontal axis is shown in FIG. 1. Two long strings of pipe 10 and 11 are suspended by barge 12 with davits 17 to provide a connection point 13. Stingers 14 and 15 and buoys 16 are necessary to relieve forces on pipes 10 and 11. By comparison, as shown in FIG. 2, pipe string ends 20 and 21 are suspended from seafloor 22 and held in a "J" configuration, without overbend, while using tension to control the sagbend. Pipe ends 20 and 21 extend through a moon pool 23 in barge 24 and are suspended by lift frame 25. Alternatively, the pipes can be joined with a lift frame on the side of a barge. One embodiment of a pipe joining hinge 30 for such operation is shown in FIG. 3. Halves 31 and 32 of the hinge are each rotated about the centerline of pipe ends 20 and 21. Hinge point 33 is below and exterior to the pipe string ends 20 and 21, but supported vertically with a lever arm 34 so that hinge axis 33 remains horizontal, even during lowering. The two halves 31 and 32 of the hinge 30 may be preinstalled on the strings 20 and 21 before they are towed to location, and pin 35 can be inserted on site. Once the pin 35 is inserted and locked, the ends are closed and brought into complete alignment simply by lowering the hinge joint toward the seafloor 22 while simultaneously holding back tension on the opposite end of the new string, FIG. 3.

A mechanical connector (not shown) may be latched and sealed as a direct result of the pivoting action associated with lowering the hinge to the seafloor. Alternatively, a connector may be separately installed or actuated at the seafloor, once the joint has been lowered. Of course, pipe plugs can be used to keep the pipe ends dry until the connector is in place. These plugs must be removed prior to locking the connector or pumped out of the pipeline afterwards. Once the connector is tight, parts of the hinge mechanism 30 can be detached and recovered for subsequent use, if desired.

The following steps are taken in order to complete a connection using hinge 30 of this invention: gross positioning of pipe ends; fine positioning to bring the pipe ends into acceptable relative position for connection method; fixing of the pipe ends relative to each other; mechanical connection of pipe strings; and fluid connection of the pipe strings. It may be assumed that the gross positioning and fine positioning steps will be difficult to accomplish in deep water by most methods that have been utilized or proposed in the past. The greatest risks and the highest level of uncertainty will exist during these steps. Once the two prepared pipe ends are securely fixed in the desired spatial relationship with each other, the remaining steps may be carried out by the use of a variety of pipe connecting devices.

Figure 4:
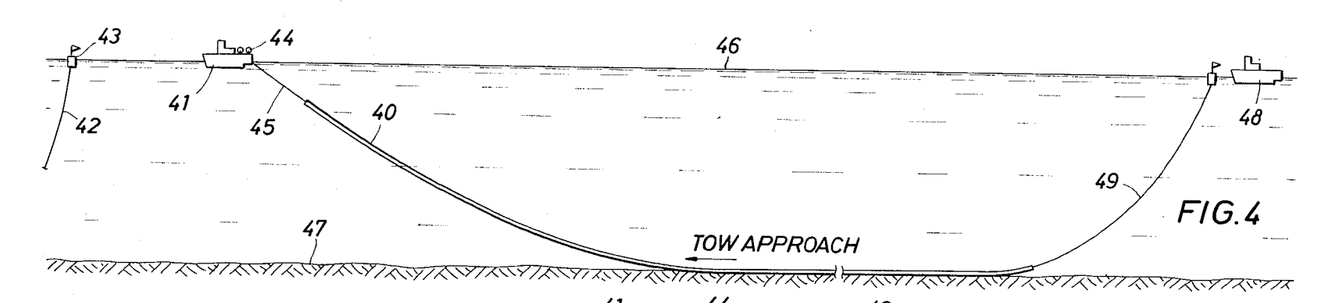
FIGS. 4-9 show steps in laying a pipeline.
Figure 5:
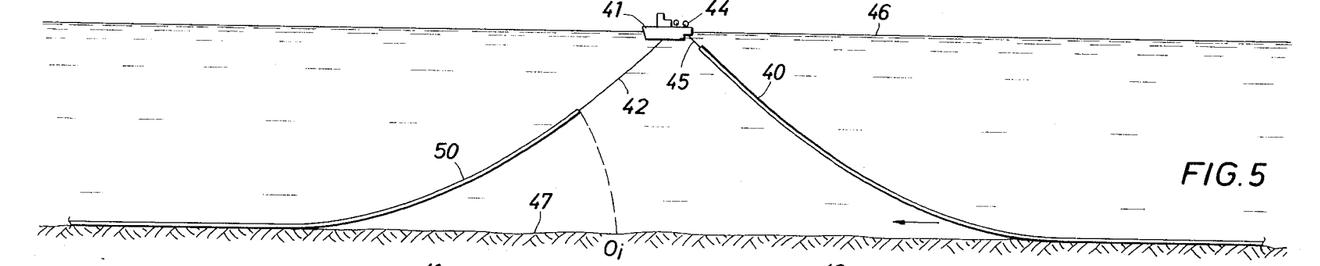

For explanatory purposes and not by way of limitation, for the following description assume that the pipeline is being constructed by the bottom-tow method where long (up to five miles in length for example) strings of pipe are prefabricated and towed along the seabed and positioned on the right-of-way simply by a tow vessel pulling on one end of the string. The tow may be either one where the pipe remains essentially on bottom during tow or, the method may involve suspending a long section of pipe under towing tension so that the pipe end is at or near the surface (FIG. 4). The first of the three major steps of this invention is, then, gross positioning. In accordance with this step the head end of a new pipe string 40 is brought into alignment along the right-of-way approaching from the direction opposite to previously installed pipe segment 50. During the final approach, a tow vessel 41 picks up a cable 42 attached to the end of the previous segment 50 and which has been secured to a buoy 43 or tended by a support vessel (not shown). Cable 42 is of a strength and length dictated by the pipe characteristics and the water depth to permit raising the pipe under tension in a manner similar to that presently practiced in abandoning and recovering pipelines from conventional lay barges. The two pipe strings 40 and 50 are now each connected to the winches 44 of vessel 41 by their lifting or towing cables 42 and 45. If the new segment has been towed on bottom, it is next raised to near the surface by the winch. The winch system is then utilized to apply tension to the cable of the previous pipe string and begin raising it also. During this process the vessel (and the entire new pipe segment) are moved in the direction of the previously installed pipeline. The point of reference is the original position (on bottom) of the previously installed pipe end (FIG. 5, reference point $O_1$).

The second of the three major steps of this invention is, as mentioned, fine positioning of the pipe ends. As the pipe ends 40 and 50 approach water surface 46, the vessel 41 is maneuvered parallel to the right-of-way to assist in bringing the ends near to each other as the cables 42 and 45 are shortened. The suspended pipe spans 40 and 50 are in most cases tolerant of rather large excursions of the vessel 41 and of changes in the horizontal force component that controls pipe curvature. If the two lifting cables 42 and 45 are arranged to essentially touch each other (for instance by crossing anywhere between the pipe ends of pipes 40 and 50 and lifting sheaves) a plane is determined in space that includes the shortened cable segments 42 and 45 and the pipe ends.

Figure 6:
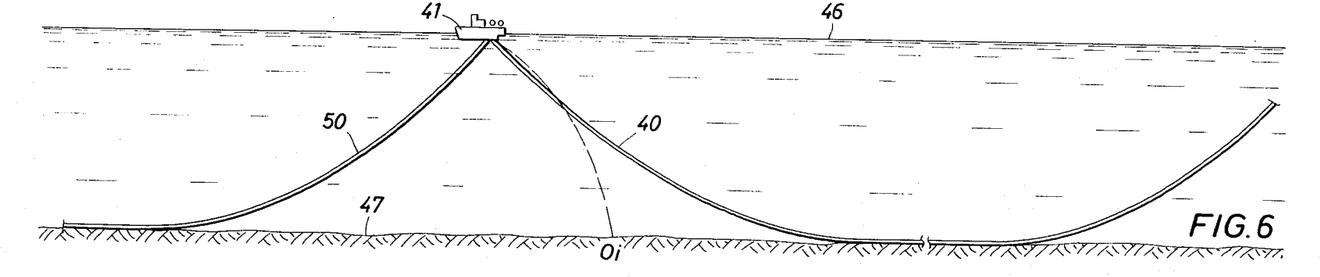

The third of the three major steps of this invention involves fixing of the pipe ends 40 and 50. By means of a split hinge 30 the two pipe ends 40 and 50 preferably are structurally joined through a pivot or hinge pin 35 so as to permit rotation about the pivot but only in the plane perpendicular to the pivot. Although the pipe ends 40 and 50 are now suspended at an angle to the horizontal (FIG. 6), the change in angle and the relative position of the two ends is determined and predictable during the process of lowering the pipe to marine bottom 47. At this time one cable is preferably disconnected, the pivot assembly 30 (and pipelines 40 and 50) then being supported by a single cable 70 attached to the pivot assembly 30. The required horizontal force components are maintained in each suspended pipe span 40 and 50 through the pivot 30 and are equal and opposite. Also, at this stage, any necessary changes in pipe end fittings preferably are accomplished and the actual pipe connector (not shown) readied. As mentioned hereinafter, the connection preferably is made on the surface through some form of swivel preferably, or the connector may be one that is activated directly by the rotation of the pipe ends 40 and 50 about the pivot 30 causing the connector halves (not shown) to be mated and latched as the pipeline 40-50 approaches the bottom 47. Alternatively, the pivot assembly 30 may serve primarily to align and secure the pipe ends 40 and 50 on bottom 47 at a fixed alignment and relative position so that a pre-installed connector (not shown) may then be activated to accomplish the mechanical and fluid connections; in this latter case the pivot assembly 30 preferably includes various latching members (not shown) to ensure such positioning.

Figure 7:
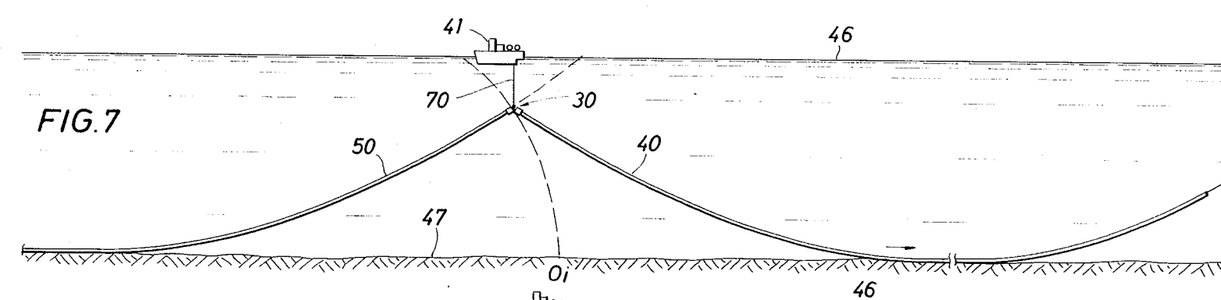
Figure 8:
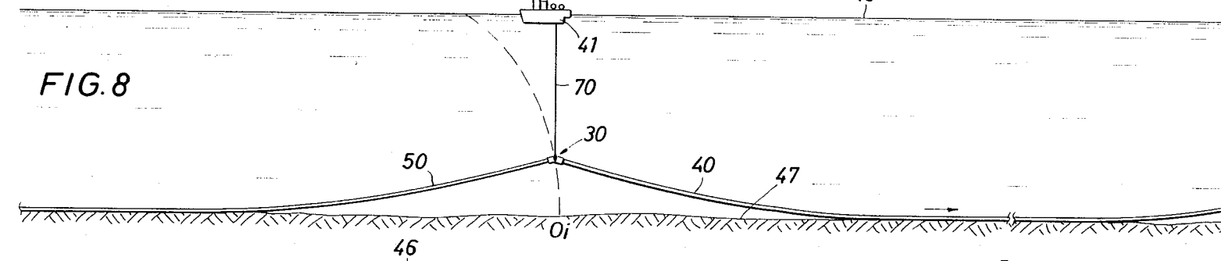

In order to restore the pipe ends 40 and 50 to the seafloor 47, it is necessary for a second tow vessel 48 to move the new pipe string 40 away from the existing string 50 so as to continue the lowering process in a more or less vertical plane that will include the reference point $O_1$. Coordination of tow force, rate of lowering and the movement of the lowering vessel away from the previous string (keeping the cable essentially vertical) is desirable to protect the suspended spans from excess curvature (FIGS. 7 and 8).

Figure 9:
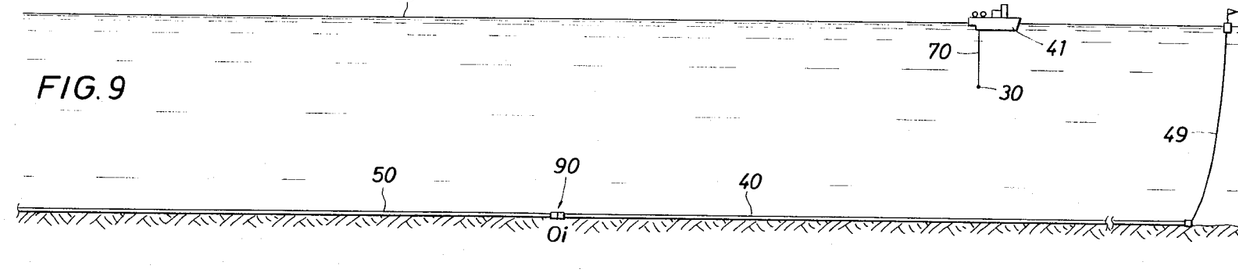

With the pipe 40-50 restored to the bottom, the next activities depend upon the type of connector 90 that is installed. If the connector 90 is of the surface installed swivel type—or if it is of the self-energizing type—the surface vessel 41 may conduct or direct a test of the connection and then disconnect from the pipeline 40-50. If the connector 90 is of the independent type, the vessel 41 may cause the connector to activate, or the connection may be energized by other means. Again, after testing, the vessel 41 is released (FIG. 9). In either case, the second tow vessel 48 may now either release (and buoy off) cable 49 or it may remain on station to tend the cable 49 for installation of string i+2.

Figure 10:
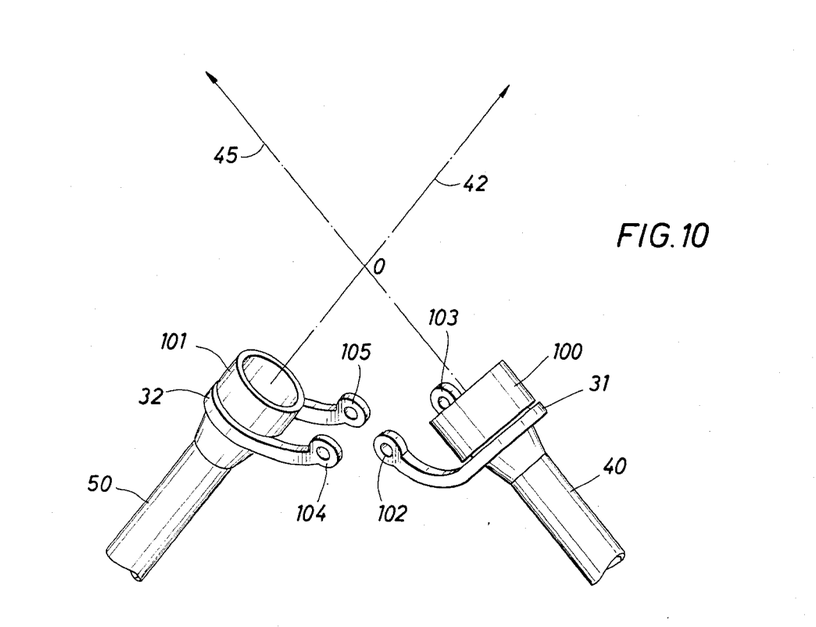
FIGS. 10-14 depict different embodiments of the eccentric hinge.
Figure 11:
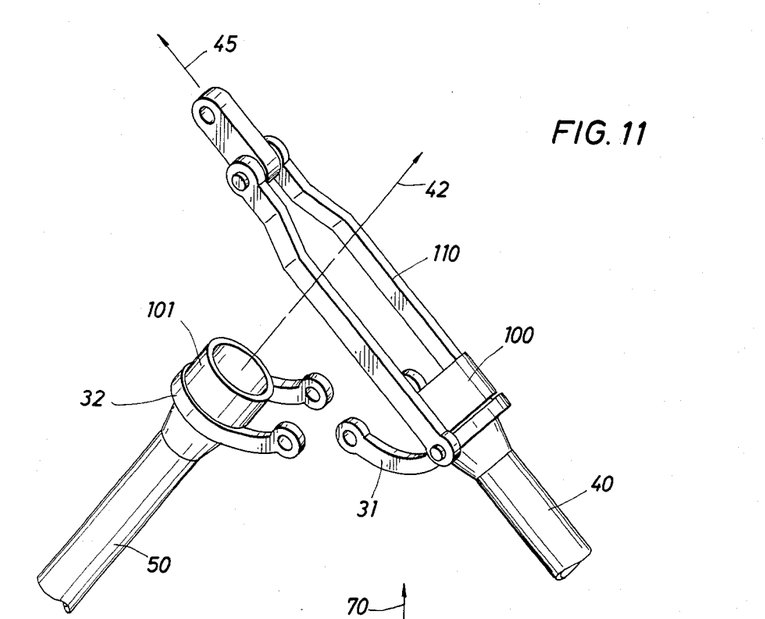
Figure 12:
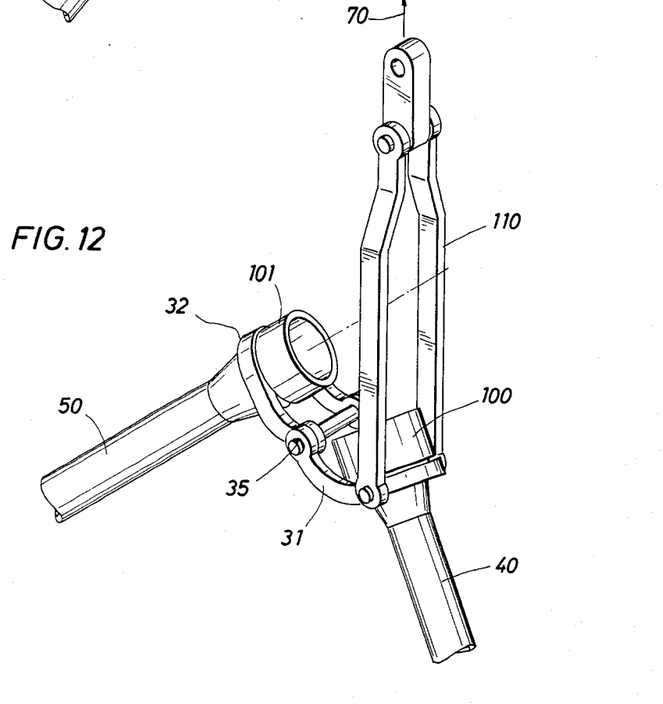

Referring now more specifically to the apparatus required for making pipeline connections, pipeline ends 40 and 50, FIG. 10 (see also FIGS. 3-9), are lifted from the marine bottom to the surface 46 of the water so that initial connecting procedures may be carried out conveniently without the need of divers under pressure or of submersible vehicles. The lifting is done by application of controlled tension in cables 42 and 45 combined with movement of the supporting vessel 41 so as to always maintain the desired horizontal and vertical components of this tension. This horizontal component restricts the curvature of the suspended pipeline span so as to prevent failure in bending as has been taught elsewhere and is well understood.

The pipe connecting means 100 and 101 were previously attached to the pipelines together with suitable fittings for establishing the mechanical alignment of the two pipe ends 40 and 50, here indicated as half hinge devices 31 and 32 preferably mounted to the pipe ends so as to permit rotation about the pipeline 40-50 without altering the tangential nature of the hinge pin holes shown as 102, 103 and 104, 105.

As the pipe ends 40 and 50 near each other, presumably at or above the water surface, the two cables 42 and 45 are crossed, forming an intersection at "O" and establishing a plane by the intersection. By changing the relative lengths of cables 42 and 45 between intersection "O" and pipe ends 40 and 50, preliminary alignment is obtained. By rotation of hinge halves 31 and 32 both mating hinge arms are aligned so that as relative cable lengths 42 and 45 are adjusted 102/105-103/104 are on a common axis and a pin 35 or other element may be introduced.

It may be desired to provide for external guides (not shown) and powered devices (not shown) suspended from the vessel 41 to assist in aligning hinge halves 31 and 32 and installing pin 35. Alternative or supplementary devices may be employed to assist in achieving alignment of the hinge halves 31 and 32, and multiple pins, bolts, clamps or other devices (not shown) may be substituted for the single hinge pin 35 shown in the drawings without departing from the scope of the invention.

Having established a hinged connection between pipe ends 40 and 50, the relative positions of all members are fixed with respect to the pin 35 and may be rotated in a plane perpendicular to the pin axis 33. For application to deepwater pipeline connections, this plane is essentially vertical, although the concept is valid whatever the inclination of this plane.

Figure 13:
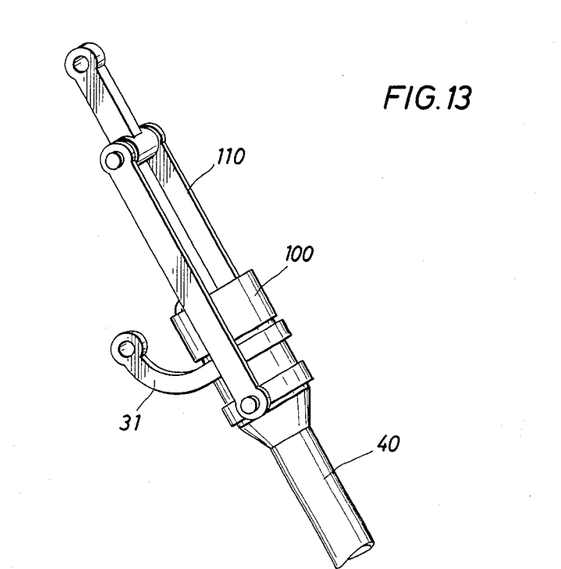

Also forming a part of one of the hinge halves 31 and 32 (or otherwise attached to one pipe end) may be a lifting or lowering frame 110, sling, bale or other device to allow vertical control of the position of the connector by the surface vessel (FIGS. 11, 12, 13, 2). This lifting/lowering frame 110 may preferably be arranged to rotate about the axis of the pipeline in a manner similar to, but independent of the hinge half 31 or 32 (FIG. 13). Yet another configuration would attach the frame to the hinge pin axis (FIG. 3). One function of this device is to maintain the attached cable 70 clear of the two connector halves 31 and 32 as they approach each other while the assembly is lowered beneath the surface. Supporting the vertical load by one cable 70 attached to the lowering frame 34, the second cable may be removed, leaving only the main lowering cable 70 attached to the entire assembly. The lifting and lowering device and the lifting and lowering cable may be preassembled.

In preparation for restoring the pipe 40-50 to the seafloor 47 and effecting a connection, several operations may be needed concerning connector halves 100 and 101: removal of any lift attachments; removal of protective caps; installation or inspection of temporary fluid sealing plugs or devices employed to prevent flooding of the pipelines during lowering; installation of connector seals, gaskets, activating devices, etc.

Lowering of the assembly is accomplished by coordinating the movements of the support vessel 41 and its lowering cable 70 with those of the two vessel 48 which is exerting a longitudinal force on the far end of one of the pipelines.

Figure 14:
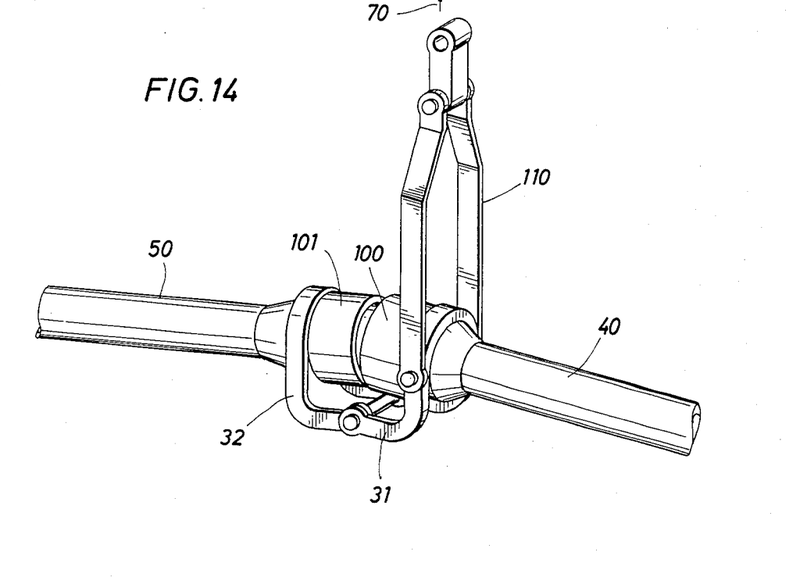

Depending upon the particular connecting device to be used, the actual mechanical and fluid connections between 40 and 50 may take place automatically or by command during lowering as controlled by rotational position about the hinge pin 35 or it may be independent and commanded and actuated after the assembly has been lowered to, or near, the marine bottom 47 (FIG. 14). In the latter case, some latching means (not shown) may be included to secure the pipelines 40-50 from further rotation when 100 and 101 are in proper alignment.

An automatic or self-activating pipeline coupling (not shown) may be included as a part of the apparatus when installing pipelines by this method. The coupling may include, firstly, an automatic guide and latching mechanism actuated by the rotation of the two pipes about the hinge with the latch position selected so as to ensure latching before the two pipelines are completely on bottom so that sufficient vertical movement is available to cause full engagement, and secondly, a fluid connection activated by external means.

Figure 15:
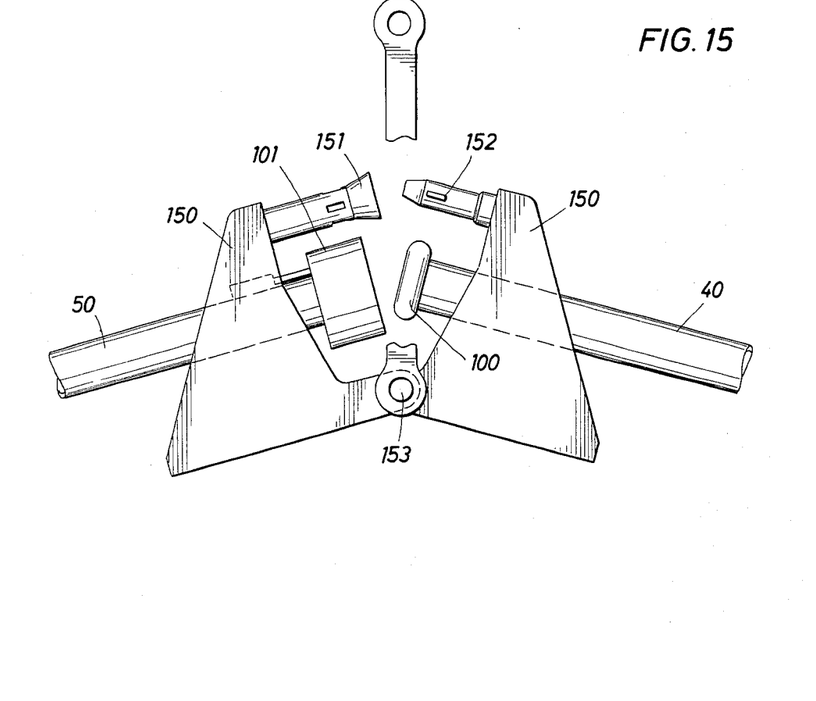
FIGS. 15 and 16 disclose hinge latching means.
Figure 16:
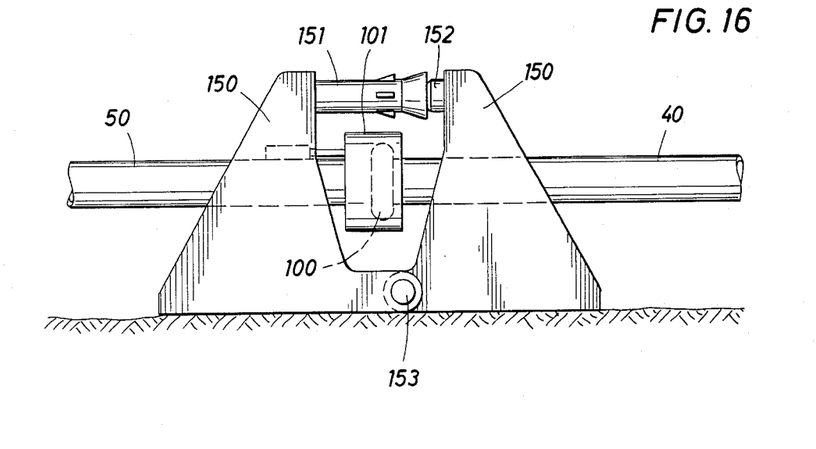

The concept of pivot alignment frame 150, and latch with a socket 151 and engagable ball 152 may also be useful in establishing a pipe connection by an independently activated coupling device. In this application the pivot device 150, through a pivot 153 and separate latch 151-152, provides alignment and spacing for any independent coupling—as shown by FIGS. 15 and 16.

The present invention includes the completion of the mechanical and fluid connection near or above the water level, with a suitable swivel included to permit the connected pipeline to be returned to the seafloor. This swivel has its axis perpendicular to the general pipeline alignment so that the two connected pipes may freely rotate about this axis as they are lowered, without affecting the connection.

Pipe bends may be required on each side of the swivel. It is frequently a requirement of pipeline design that large radius (equivalent to 3 or 4 pipe diameters) bends be employed in order to assure free passage of scrapers or pigs during pipeline operations. For this reason, it may be necessary to supply specialized lifting links or frames in order to raise and to align the pipeline ends with the large bends attached. Alternatively, the pipe ends may be raised without bends or swivel halves and then joined by a prepared spool piece (bends and swivel as a unit) or by two girth welds or mechanical connections.

The mechanical and fluid connection may be achieved by any of several means, including: a connector-swivel; a single mechanical connector, preferably in the horizontal run at one side of the built-in swivel; a girth weld; or two girth welds, or two mechanical connections, to install a prefabricated spool including bends and swivel, by joining in the near vertical pipe ends.

A significant feature of using an eccentric hinge alignment procedure as set forth herein is that, upon lowering of the hinged pipe ends, a substantial bending lever is created to press the pipe ends together. This means not only that connectors requiring large engagement force can be used, but more importantly a connector which automatically latches when rotated into position can be employed.

What is claimed is:

1. A method for the offshore joining of two pipe strings at least near the surface of the water, part of each pipe string laying on the seafloor during at least part of the time of joining, comprising suspending the two pipe strings from means above the seafloor and holding each pipe string in a "J" configuration while adjacently positioning the upper ends of the pipe strings with the lower ends of the pipe strings spaced apart, hinging the adjacent pipe ends together, and lowering the hinged pipe ends to the seafloor while simultaneously exerting axial tension on one of the pipe strings from a remote location.

2. The method of claim 1 wherein the adjacent ends of the pipe strings are lifted to at least near the surface of the water by a vessel effecting the joining of the two pipe strings.

3. The method of claim 2 wherein at least one of the pipe strings is located completely on the seafloor prior to joining with the other pipe string.

4. The method of claim 3 wherein one of the pipe strings is towed on-bottom for joining with the other pipe string, and the other pipe string is also on-bottom and has a cable and attached buoy affixed thereto.

5. The method of claim 4 including locating the buoy and lifting the other pipe string with the cable.

6. A method for aligning the pipe ends of two pipe strings comprising, affixing the pipe ends with disconnected hinge halves each having a pivot axis exterior to the pipe ends, suspending the two pipe strings and holding each pipe string in a "J" configuration while adjacently positioning the upper ends of the pipe strings with the lower ends of the pipe strings spaced apart and the center lines of the adjacent pipe ends crossing a common point above the pipe ends and merging the pivot axes of the hinge halves below the pipe ends, rotatably connecting the hinge halves at the merged pivot axes, and lowering the pipe ends and associated pipe strings to an aligned position.

7. The method of claim 1 wherein the two pipe ends are parts of two pipe strings located offshore.

8. The method of claim 7 wherein the two pipe strings are joined at least near the surface of the water, part of each pipe string laying on the seafloor during at least part of the time of aligning the pipe ends.

9. The method of claim 1 wherein the pipe ends are lowered to an aligned position by lowering means attached to at least one of the hinge halves.

10. The method of claim 9 wherein the lowering means is attached to the hinge halves at the pivot axes.

11. The method of claim 1 wherein the disconnected hinge halves are rotated about a centerline of the pipe ends to facilitate merging the pivot axes.

* * * * *